United States Patent
Lavery et al.

(10) Patent No.: US 9,454,402 B2
(45) Date of Patent: Sep. 27, 2016

(54) INFORMATION DISPLAY FOR DISPLAYING DIFFERENT TYPES OF PERFORMANCE DATA USING A SINGLE INTEGRATED VISUAL INDICATOR

(71) Applicant: International Business Machines Corporation, Armonk, NY (US)

(72) Inventors: Andrew J. Lavery, Austin, TX (US); James L. Lentz, Austin, TX (US); David B. Salgado, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 204 days.

(21) Appl. No.: 14/197,172

(22) Filed: Mar. 4, 2014

(65) Prior Publication Data

US 2015/0254107 A1 Sep. 10, 2015

(51) Int. Cl.
*G06F 3/048* (2013.01)
*G06F 9/50* (2006.01)
*G06F 11/34* (2006.01)
*G06F 3/0484* (2013.01)
*B60K 35/00* (2006.01)
*B60K 37/02* (2006.01)

(52) U.S. Cl.
CPC .............. *G06F 9/5011* (2013.01); *B60K 35/00* (2013.01); *B60K 37/02* (2013.01); *G06F 3/0484* (2013.01); *G06F 3/04847* (2013.01); *G06F 11/3433* (2013.01); *B60K 2350/1004* (2013.01); *B60K 2350/1072* (2013.01); *B60K 2350/1092* (2013.01); *B60K 2350/408* (2013.01)

(58) Field of Classification Search
CPC ...................................................... G06F 3/048
See application file for complete search history.

(56) References Cited

U.S. PATENT DOCUMENTS

| | | |
|---|---|---|
| 3,030,804 A | 4/1962 | Riegger |
| 4,247,757 A | 1/1981 | Crump, Jr. |
| 4,523,457 A | 6/1985 | Bayer et al. |
| 7,966,121 B2 | 6/2011 | Aoyagi et al. |
| 8,055,439 B2 | 11/2011 | Ji et al. |
| 8,112,203 B2 | 2/2012 | Shin et al. |
| 8,311,722 B2 | 11/2012 | Zhang et al. |
| 2003/0095156 A1* | 5/2003 | Klein .................... G06F 3/0481 715/864 |
| 2005/0154502 A1* | 7/2005 | Kolpasky ............... B60K 35/00 701/1 |
| 2006/0209040 A1* | 9/2006 | Garside ............... G06F 3/03545 345/173 |
| 2008/0306636 A1 | 12/2008 | Caspe-Detzer et al. |
| 2009/0070027 A1 | 3/2009 | Newhouse et al. |
| 2009/0172527 A1* | 7/2009 | Buecker ........... G08G 1/096716 715/700 |
| 2010/0235007 A1* | 9/2010 | Constien ............ G01R 31/3679 700/291 |
| 2010/0283592 A1* | 11/2010 | Boutin ................... B60K 35/00 340/438 |
| 2012/0042716 A1* | 2/2012 | Watson .................. B60K 35/00 73/114.54 |
| 2013/0067375 A1* | 3/2013 | Kim ........................ F25D 29/00 715/769 |

FOREIGN PATENT DOCUMENTS

| | | |
|---|---|---|
| JP | 2009126464 | 6/2009 |
| JP | 2010149665 | 7/2010 |

* cited by examiner

*Primary Examiner* — Jennifer To
*Assistant Examiner* — Xuyang Xia
(74) *Attorney, Agent, or Firm* — Convergent Law Group LLP

(57) ABSTRACT

Exemplary embodiments display different types of performance-related data on an information display having a range of units for one type of measured data. Aspects of exemplary embodiment include presenting, by at least one software component executed by a processor, a rate of resource consumption in a visual indicator; and using the visual indicator as a pointer on the information display to a current unit of the measured data.

19 Claims, 4 Drawing Sheets

INFORMATION DISPLAY FOR DISPLAYING DIFFERENT TYPES OF PERFORMANCE DATA USING A SINGLE INTEGRATED VISUAL INDICATOR

BACKGROUND

Managing the consumption of resources usually requires making performance tradeoffs between conflicting goals. A user of systems that mediate performance tradeoffs typically must consider multiple types of performance related data from multiple sources of information. Often the performance data from these sources of information are represented in separate information displays or gauges that the user must somehow integrate.

The speedometer (or tachometer) and fuel consumption displays in an automobile are example information displays that display different but related types of performance data. Many modern cars have a fuel consumption indicator in addition to the speedometer (and/or tachometer), which may be represented using digital readouts, gauges, or bar graphs.

One problem with conventional information displays is that different types of performance related data, such as speed and fuel consumption, are presented separately, either in different gauges or using different indicators within the same gauge. To view information on each type of data, the user must take his/her eyes off the road to fixate on each separate display and/or indicators and then expend attentional and cognitive resources to integrate the data. All of this detracts from the user's ability to safely operate the vehicle without risk of collision.

Accordingly, it would be desirable to provide an improved method and system for displaying different types of performance-related data.

BRIEF SUMMARY

The exemplary embodiment provides methods and systems for displaying different types of performance-related data on an information display having a range of units for one type of measured data. Aspects of exemplary embodiment include presenting, by at least one software component executed by a processor, a rate of resource consumption in a visual indicator; and using the visual indicator as a pointer on the information display to a current unit of the measured data.

According to the method and system disclosed herein, the exemplary embodiment merges a resource consumption indicator and a performance indicator into a single visual indicator on an information display device. Because the two different, but related types of performance data, are integrated into a single visual indicator, the user can ascertain information about both at a single glance.

DETAILED DESCRIPTION

The exemplary embodiment relates to a method and system for displaying different types of performance-related data using a single integrated visual indicator. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

The exemplary embodiments provide a method and system for displaying different types of performance-related data using a single integrated visual indicator. In an exemplary embodiment, the integrated visual indicator merges an efficiency data display and a performance data display into a single control or pointer of an information displays such as a gauge. Further embodiments for the integrated visual indicator include a user interface on the information display that provides a user with intuitive integrated actions for setting performance thresholds and for modifying dynamic aspects of the overall system such as a rate of accelerating performance.

Figure 1:
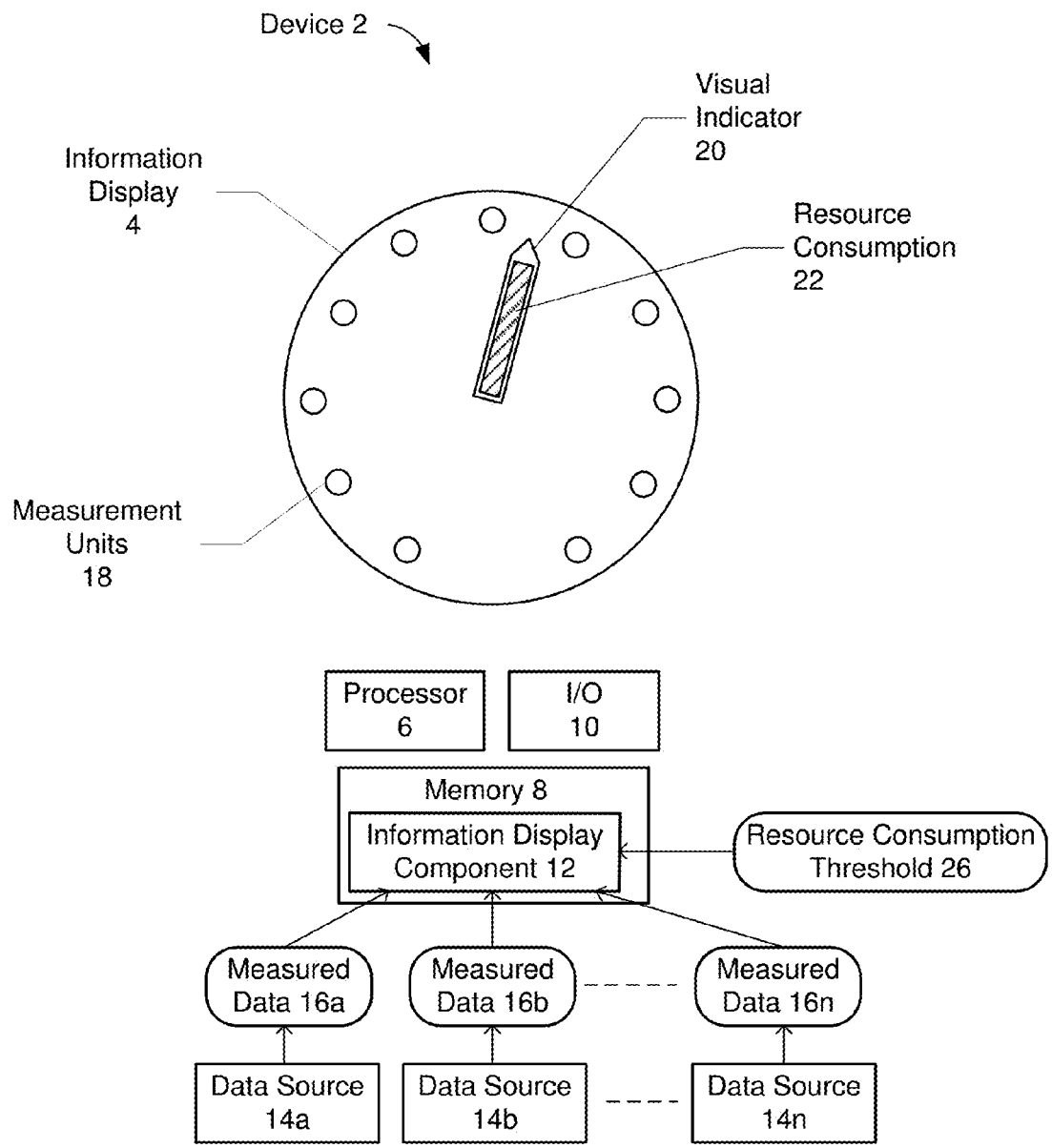
FIG. 1 is a block diagram illustrating an exemplary system environment in which one embodiment for displaying different types of performance-related data may be implemented.

FIG. 1 is a block diagram illustrating an exemplary system environment in which one embodiment for displaying different types of performance-related data may be implemented. The system may include a device 2 having an information display 4, a processor 6, a memory 8, input/output (I/O) 10, an information display component 12, and at least two data sources 14a, 14b, 14n (collectively data sources 14). The information display 4, processor 6, memory 8 and I/O 10 may be coupled together via one or more buses (not shown). The information display component 12 may comprise software that resides in memory 8 when executed by the processor 6.

The system in which the device 2 may be implemented may represent any type of system that is used to perform a physical function from which performance data may be derived and measured. Example types of systems may include transportation vehicles (e.g., trains, planes, automobiles, boats), machinery, computers and the like.

The memory 8 may comprise various types of computer-readable media, e.g., flash memory, hard drive, optical disk drive, magnetic disk drive, and the like, containing computer instructions that implement the functionality disclosed when executed by the processor. The device 2 may further include wired or wireless network communication interfaces for communication.

The processor 6 may be part of data processing system suitable for storing and/or executing software code, which may comprise an operating system and various applications. The processor 6 may be coupled directly or indirectly to elements of the memory 8 through a system bus (not shown). The memory elements can include local memory employed during actual execution of the program code, bulk storage, and cache memories which provide temporary storage of at least some program code in order to reduce the number of times code must be retrieved from bulk storage during execution.

The input/output 10 or I/O devices can be coupled to the system either directly or through intervening I/O controllers. Network adapters (not shown) may also be coupled to the system to enable the data processing system to become coupled to other data processing systems or remote printers or storage devices through intervening private or public networks. Modems, cable modems and Ethernet cards are just a few of the currently available types of network adapters.

During operation of the device, the data sources 14a, 14b, 14n (collectively data sources 14) may collect different types of performance data and output measured data 16a, 16b, 16n (collectively measured data 16). Example types of measured data 16 may include speed, pressure, temperature, an amount, and the like, during operation of the device 2. In one embodiment, the data sources 14 may represent different types of sensors. The data sources 14 and/or the information display component 12 may determine a magnitude, amount, or volume of the performance data for display.

As such, the information display 4 includes a range of measurement units 18 for at least one type of measured data 16. Examples of the measurement units 18 may include a range of miles-per-hour/kilometers per hour for a speedometer (e.g., 0-200 mph) and/or the range of revolutions per minute (RPM) for a tachometer (e.g., 0-7000 RPM). Although information display 4 is shown as having a round shape, nothing prevents the information display 4 from being implemented in a different shape (e.g., rectangular, square, and the like). Similarly although the range of measurement units 18 are shown as round symbols, nothing prevents the markings for the units 18 from being any type of graphic symbol or alphanumeric (e.g., hash marks, numbers, and the like).

Figure 2:
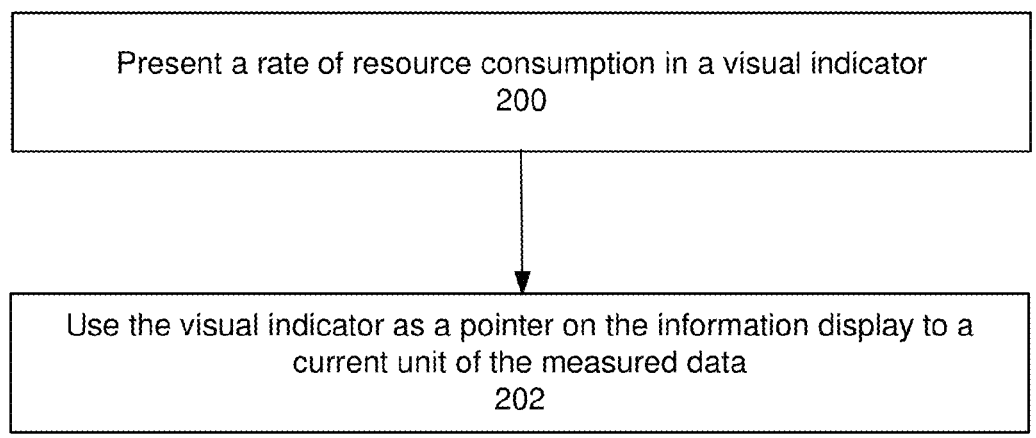
FIG. 2 is a flow diagram illustrating one embodiment of a process for displaying different types of performance-related data on the information display

The information display component 12 receives the measured data 16, may optionally perform calculations on the measured data 16, and presents the measured data 16 on the information display 4 to a user in accordance with the exemplary embodiments, as described in FIG. 2.

Although information display component 12 is shown as a single component, it should be understood that the functions of the information display component 12 may be implemented using a different number of software components.

FIG. 2 is a flow diagram illustrating one embodiment of a process for displaying different types of performance-related data on the information display 3. In one embodiment, the process is performed by the information display component 12 when executed by the processor 6 during operation of the device 2.

The process may begin by presenting a rate of resource consumption in a visual indicator (block 200). The same visual indicator is then used as a pointer on the information display to a current unit of the measured data (block 202).

In the embodiment shown in FIG. 1 where the information display 4 may comprise a speedometer, for example, a conventional "needle" of the gauge-like speedometer is replaced with a visual indicator 20 that presents resource consumption 22 (e.g., mpg or mpge), while at the same time also indicates a current measurement unit 18, which in this example this speed.

In one embodiment, the resource consumption 22 is presented as a bar graph comprising a body of the visual indicator 20, where a shaded portion of the bar graph dynamically changes in proportion to the values represented. As shown, the visual indicator 20 may be presented as a pointer/needle on the information display 4 that dynamically moves to point to a current measurement unit 18. Although the resource consumption may be presented as a bar graph and the visual indicator may be presented as a pointer/needle in the exemplary embodiment, nothing prevents the resource consumption 22 from being indicated using other types of visual indicators.

Thus, the present invention merges a resource consumption indicator (which may also be referred to as an efficiency data indicator) and a performance indicator into a single or integrated visual indicator 20 on the information display device 4. Because the two different, but related types of performance data, are integrated into a single visual indicator 20, the user can ascertain information about both at a single glance. In the case where the information display 4 is used in a car, the exemplary embodiments may reduce the time when the user's eyes are off the road.

Applications of the integrated visual indicator 20 extend beyond automotive speedometers to include any kind of power consumption rate metering (measured data versus related resource consumption) and aspects of computer performance. Example combinations may include, but are not limited to, speed vs fuel efficiency, power versus efficiency, processing power versus memory consumption, processing power versus battery consumption, and processing power versus CPU utilization.

Figure 3D:
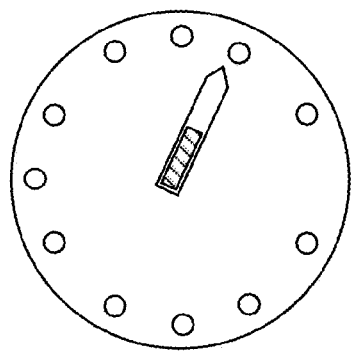
FIGS. 3A, 3B, 3C and 3D are diagrams showing four "snapshots" of the information display over time during operation of the device, which in this example may be a car.
Figure 3C:
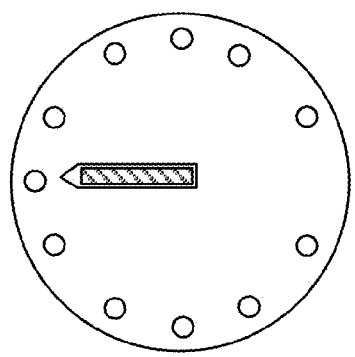
Figure 3B:
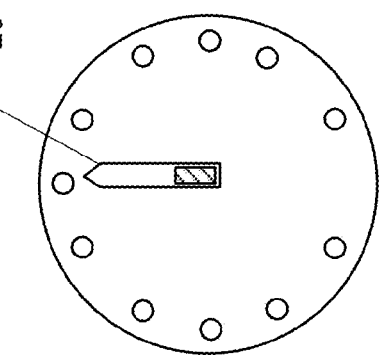
Figure 3A:
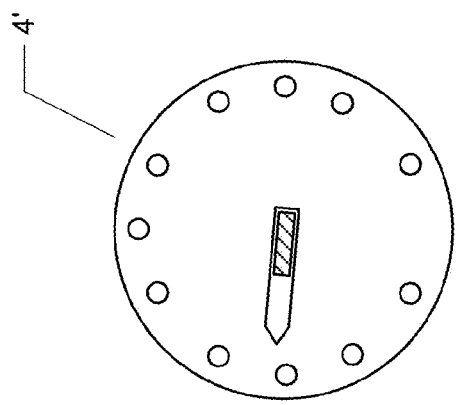

FIGS. 3A, 3B, 3C and 3D are diagrams showing four "snapshots" of the information display 4' over time during operation of the device 2, which in this example may be a car. In FIGS. 3A and 3B, the car is accelerating so resource consumption/efficiency remains low, as shown by the short bar graph of the visual indicator 20'. Based on the position of the visual indicator along the periphery of the information display, it is also shown that the speed of the car begins low initially and then raises during the acceleration. In FIG. 3C, the car is traveling at a moderate, constant rate (or possibly coasting) so efficiency is high as shown by the completely filled bar graph of the visual indicator. In FIG. 3D, the car is at a constant high rate of speed so resource consumption/efficiency is low.

In a further aspect of the exemplary embodiment, the information display component 12 may also be configured to indicate a user's attainment of an efficiency goal by changing a visual appearance of the visual indicator 20. For example, assume that red is a default color for the resource consumption/efficiency bar graph. If the information display component 12 detects that the car is attaining optimal efficiency for a given set of conditions, the information display component 12 may change color of the resource consumption/efficiency bar graph from red to green, for instance, to indicate 'success'. In another embodiment, the resource consumption 22 may flash.

According to a further embodiment, the information display component 12 may be configured to the allow user to modify a resource consumption threshold for attaining successful efficiency.

Figure 4A:
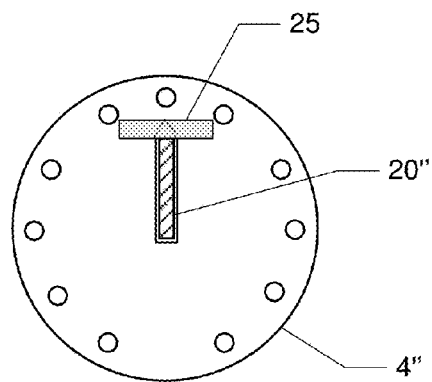
FIGS. 4A and 4B are diagrams illustrating an example user interface displayed by the information display component on the information display to enable the user to modify a resource consumption threshold.
Figure 4B:
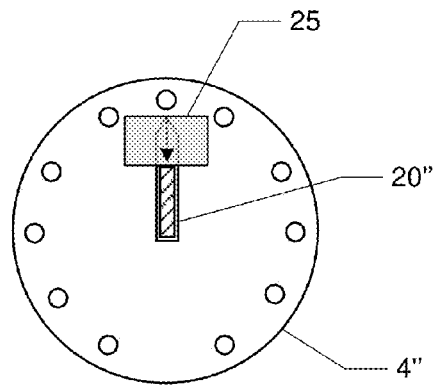

FIGS. 4A and 4B are diagrams illustrating an example user interface displayed by the information display component 12 on the information display 4" to enable the user to modify a resource consumption threshold 26 (FIG. 1). This embodiment assumes that the information display 4" is touchscreen enabled. In FIG. 4A, the information component 12 may be responsive to a user tap on the visual indicator 20" to enter a threshold modification mode and display a threshold selection window 25. The user may then drag one side of the threshold selection window 25 to decrease/increase the size of the selection window over the visual indicator 20" and the bar graph showing resource consumption. The resource consumption threshold 26 is set when the user releases the threshold selection window 25.

In another embodiment, one or more of the data sources 14 may be also used to automatically customize the resource consumption threshold 26 to reflect additional variables in the current context of device operation that influence both performance and efficiency. For example, when the car is travelling uphill, the rate of fuel consumption goes up when speed and acceleration are held constant. In this case, the inclination of the vehicle as measured from one of the data sources 14 might be used to relax (or tighten in the case of downhill travel) the resource consumption threshold 26 used to represent satisfactory efficiency.

In yet a further embodiment, the information display component 12 may be further configured to allow the user to control a rate of change of one or more types of the measured data 14.

Figure 5A:
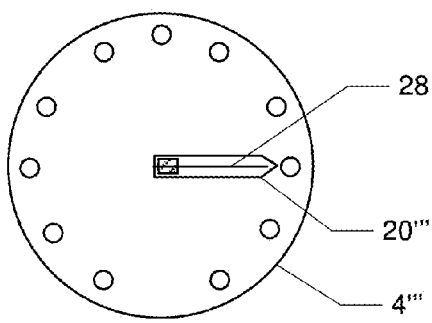
FIGS. 5A and 5B are diagrams illustrating a user interface displayed on the information display for allowing the user use the visual indicator to control a rate of change of the measured data.
Figure 5B:
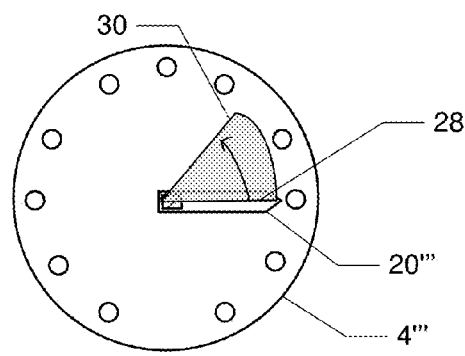

FIGS. 5A and 5B are diagrams illustrating a user interface displayed by the information display component 12 on the information display 4''' for allowing the user use the visual indicator 20''' to control a rate of change of the measured data. Again using automotive speed and fuel consumption rate as an example application for the invention, the information display component 12 may display a user interface on the information display 4''' that allows the user to control acceleration rate. Many cars support economy and performance modes that bias acceleration and shift points either toward efficiency (economy mode) or performance (sport mode).

According to the exemplary embodiment, the user may control/modify performance/economy bias by direct manipulation of the information display 4. In one embodiment, in response to the information display component 12 detecting a user action such as tapping a center of the information display 4, the information display component 12 may cause the information display 4 to enter an edit mode. In the edit mode, the visual indicator 20''' is moved to a predetermined position, such as the 3 o'clock position on the information display 4, and displays some indication of edit mode.

FIGS. 5A and 5B show that in one example, the indication of edit mode may be indicated by a displayed control comprising a first line 28 symbolizing an x-axis through the visual indicator 20''', and a second line 30 displayed such that the two lines 28 and 30 form an angle with vertex positioned at the center of the round information display 4'''. The angle thus created represents a current rate of acceleration defined in the control, where the user may drag the second line 30 up or down to modify the bias between performance (by forming a steep angle) or economy (by forming a shallow angle).

A method and system for displaying different types of performance-related data on an information display has been disclosed. In automotive applications, the benefits of the integrated visual indicator 20 may include improved fuel efficiency and safety. The change in appearance (e.g., color) of the visual indicator 20 upon reaching an optimal trade-off between acceleration and fuel efficiency may provide payoff value as in "game psychology" and thus encourages more economical driving. The user customization features as described in FIGS. 4A, 4B, 5A and 5B provide intuitive, direct manipulation control in a minimal amount of space.

The present invention has been described in accordance with the embodiments shown, and there could be variations to the embodiments, and any variations would be within the spirit and scope of the present invention. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A method of displaying different types of performance-related data on an information display having a range of units for one type of measured data, comprising:
   presenting, by at least one software component executed by a processor, a rate of resource consumption in a visual indicator;
   using the visual indicator as a pointer on the information display to point to a current unit of the measured data;
   allowing a user to control a rate of change of the measured data by:
      responsive to detecting a user action on the information display, causing the information display to enter an edit mode, wherein the visual indicator is moved to a predetermined position on the information display, and an indication of edit mode is displayed; and
      wherein the indication of edit mode is indicated by a displayed control comprising a first line symbolizing an axis through the visual indicator, and a second line displayed such that the first and second lines form an angle with vertex positioned at the center of the round information display, wherein the angle represents a current rate of acceleration defined in the displayed control, such that the user drags the second line up or down to modify the bias between performances by forming a steep angle or economy by forming a shallow angle.

2. The method of claim 1 further comprising presenting the rate of resource consumption as a bar graph comprising a body of the visual indicator.

3. The method of claim 1 further comprising presenting the visual indicator as a pointer/needle on the information display.

4. The method of claim 1 wherein a combination of the measured data and the resource consumption shown by the visual indicator comprises at least one of: speed vs fuel efficiency, power versus efficiency, processing power versus memory consumption, processing power versus battery consumption, and processing power versus CPU utilization, respectively.

5. The method of claim 1 wherein the at least one software component is further configured to allow a user to modify a resource consumption threshold for attaining successful efficiency.

6. The method of claim 5 wherein information display is touchscreen enabled and the software component displays a user interface on the information display that enables the user to modify the resource consumption threshold.

7. The method of claim 6 wherein the at least one software component is responsive to a user tap on the visual indicator to enter a threshold modification mode and display a threshold selection window, and wherein in response the user drags one side of the threshold selection window to decrease/increase the size of the selection window over the visual indicator to adjust a size of the selection window.

8. The method of claim 6 wherein the at least one software component uses one or more data sources to automatically customize the resource consumption threshold to reflect additional variables in a current context of device operation that influence both performance and efficiency.

9. An executable software product stored on a non-transitory computer-readable medium containing program instructions for displaying different types of performance-related data on an information display having a range of units for one type of measured data, the program instructions that, when executed by a processor, cause the processor to perform operations comprising:
  presenting, by at least one software component executed by a processor, a rate of resource consumption in a visual indicator;
  using the visual indicator as a pointer on the information display to point to a current unit of the measured data;
  allowing a user to control a rate of change of the measured data by:
    responsive to detecting a user action on the information display, causing the information display to enter an edit mode, wherein the visual indicator is moved to a predetermined position on the information display, and an indication of edit mode is displayed; and
    wherein the indication of edit mode is indicated by a displayed control comprising a first line symbolizing an axis through the visual indicator, and a second line displayed such that the first and second lines form an angle with vertex positioned at the center of the round information display, wherein the angle represents a current rate of acceleration defined in the displayed control, such that the user drags the second line up or down to modify the bias between performances by forming a steep angle or economy by forming a shallow angle.

10. The executable software product of claim 9 further comprising program instructions for presenting the rate of resource consumption as a bar graph comprising a body of the visual indicator.

11. The executable software product of claim 9 further comprising program instructions for presenting the visual indicator as a pointer/needle on the information display.

12. The executable software product of claim 9 wherein a combination of the measured data and the resource consumption shown by the visual indicator comprises at least one of: speed vs fuel efficiency, power versus efficiency, processing power versus memory consumption, processing power versus battery consumption, and processing power versus CPU utilization, respectively.

13. The executable software product of claim 9 wherein the at least one software component is further configured to allow a user to modify a resource consumption threshold for attaining successful efficiency.

14. The executable software product of claim 13 wherein information display is touchscreen enabled and the software component displays a user interface on the information display that enables the user to modify the resource consumption threshold.

15. The executable software product of claim 14 wherein the at least one software component is responsive to a user tap on the visual indicator to enter a threshold modification mode and display a threshold selection window, and wherein in response the user drags one side of the threshold selection window to decrease/increase the size of the selection window over the visual indicator to adjust a size of the selection window.

16. The executable software product of claim 14 wherein the at least one software component uses one or more data sources to automatically customize the resource consumption threshold to reflect additional variables in a current context of device operation that influence both performance and efficiency.

17. A device, comprising:
  a memory;
  a processor coupled to the memory;
  an information display that displays different types of performance-related data and having a range of units for one type of measured data coupled to the memory and the processor; and
  at least one software component executed by the processor that is configured to:
    present a rate of resource consumption in a visual indicator;
    use the visual indicator as a pointer on the information display to point to a current unit of the measured data;
    allow a user to control a rate of change of the measured data by:
      responsive to detecting a user action on the information display, cause the information display to enter an edit mode, wherein the visual indicator is moved to a predetermined position on the information display, and an indication of edit mode is displayed; and
      wherein the indication of edit mode is indicated by a displayed control comprising a first line symbolizing an axis through the visual indicator, and a second line displayed such that the first and second lines form an angle with vertex positioned at the center of the round information display, wherein the angle represents a current rate of acceleration defined in the displayed control, such that the user drags the second line up or down to modify the bias between performances by forming a steep angle or economy by forming a shallow angles.

18. The device of claim 17 wherein the at least one software component is further configured to allow a user to modify a resource consumption threshold for attaining successful efficiency.

19. The method of claim 17 wherein the at least one software component is further configured to allow the user to control a rate of change the measured data.

* * * * *